Nov. 15, 1927.

J. RIEBE ET AL 1,649,487

PIPE BOWL CLEANER

Filed Aug. 10, 1927

INVENTORS
Johannes Riebe,
BY and Adolf Pråmassing
_____ ATTORNEY.

Patented Nov. 15, 1927.

1,649,487

UNITED STATES PATENT OFFICE.

JOHANNES RIEBE, OF NEW YORK, AND ADOLF PRÄMASSING, OF BRONXVILLE, NEW YORK.

PIPE-BOWL CLEANER.

Application filed August 10, 1927. Serial No. 211,883.

Our invention consists in a novel and useful device for cleaning the bowls of tobacco pipes and is so designed that it can be readily adapted to pipe bowls of various sizes and shapes. As will appear from the following detailed description, our device is of very simple construction and easy in operation and is of such small size that it can be carried in a man's pocket. The device can be easily taken apart and assembled, and the parts are of solid construction and not subject to much wear so that the device will last indefinitely, except for the scraper blades which however, if desired, can be re-sharpened, or are easily replaced.

Figure 1:
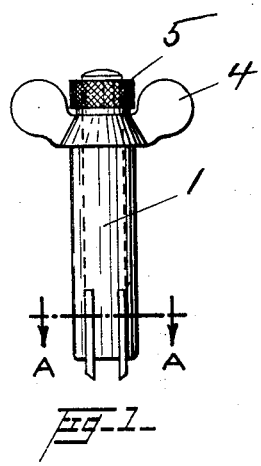
Figure 2:
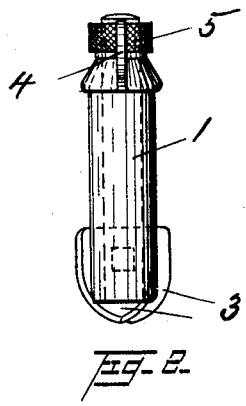
Figure 3:
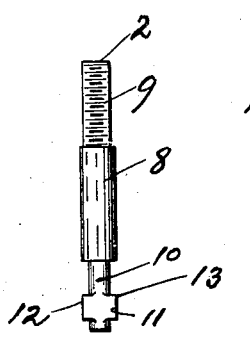
Figure 4:
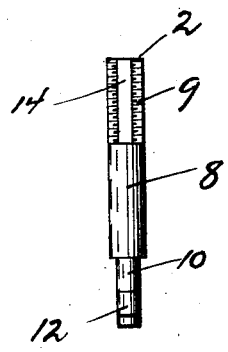
Figure 5:
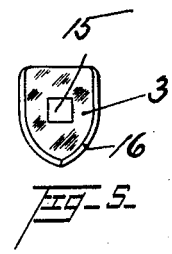
Figure 6:
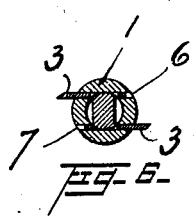
Figure 7:
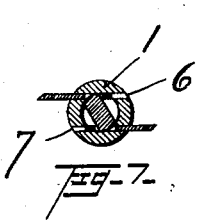

In the appended drawing, we have shown by way of illustration, an embodiment of our invention, and in this drawing, Fig. 1 is an elevational view of our device in assembled condition ready for use; Fig. 2 is a similar view as Fig. 1 at right angles thereto, Figs. 3, 4 and 5 show the various parts of the device; Figs. 6 and 7 are cross-sections taken both along line A—A in Fig. 1 showing the scraper blades in different positions.

The device as shown in the drawing comprises the following parts, to wit: A tubular part, 1, a bolt 2, two scraper blades 3, a wing-part 4 and a knurled nut 5. The tubular element 1, as shown in Figs. 1 and 2 is adapted to receive therein the bolt 2 and is provided with slots 6 and 7 (Figs. 6 and 7) into which slots are placed the scraper blades 3 so that they are parallel to each other, as clearly shown. The bolt 2 has a cylindrical portion 8, a screw-threaded portion 9, a reduced portion 10 and a small flat portion 11 formed with cam-like projections 12 and 13. Some of the screw-threads on the screw-threaded portion 9 are cut away on opposite sides of said portion so as to form flat faces, one being shown at 14 in Fig. 4. The scraper blades 3 which are preferably shaped as shown in Fig. 5 are each provided with an angular opening 15 and have a bevelled cutting edge 16.

For assembling the device, the bolt 2 is inserted into the tubular part 1, the wing part 4 is placed on the protruding screw-threaded end of the bolt and the knurled nut 5 on top of said wing part. The latter engages with its flat inner faces the flat face 14 of bolt 2. Finally, the two scraper blades 3 are inserted into the slots 6 and 7 of the tubular part 1 while the small flat portion 11 of the bolt 2 is in a position parallel to the slots. Then, as the bolt 2 is turned 90° the cam-like projections 12 and 13 of the flat portion 11 of the bolt enter the angular openings in the scraper-blades thereby retaining the blades in the slots as clearly shown in Fig. 6. In this position, the edges of the blades 3 protrude only slightly beyond the periphery of the tubular part 1, but when the bolt 2 by means of the wing-part 4 is turned in either direction, the two blades 3, by means of the cam-like projections 12, 13 are shifted outwardly in opposite direction as shown in Fig. 7. Depending on the amount of rotation of the bolt 2, the blades 3 are shifted to a more or less protruding position and in this way can be readily adjusted to pipe-bowls of various sizes.

Before bolt 2 can be turned, the knurled nut 5 must, of course, be loosened, so as to release the wing-part 4, and after by the turn of the bolt the blades 3 have been shifted to the desired position, the wing-part 4 is again secured by the tightening of the knurled nut 5.

Our invention is, of course, capable of various modifications and therefore, we do not limit ourselves to the construction we have shown and described, but claim:

1. In a cleaning device for the bowls of tobacco-pipes, the combination of a tubular part, having parallel slots. blades adapted to be received in said parallel slots of said tubular part and having each an angular opening, and a bolt extending through said tubular part and having projections adapted to enter the openings in said blades for shifting said blades in opposite direction upon the turning of said bolt.

2. In a cleaning device for the bowls of tobacco-pipes, the combination of a tubular part having two parallel slots at one end, scraper-blades adapted to be received in said slots being movable therein and each having an angular opening, a bolt extending through said tubular part and having cams for engaging the angular openings of said blades, the outwardly projecting end of said bolt having two flattened and two screw-threaded portions, a wing-part having flat inner faces to fit the flat sides of said screw-thread portions, and a knurled nut adapted to engage said screw-threaded portions for holding said wing part in fixed position.

In testimony whereof we affix our signature.

JOHANNES RIEBE.
ADOLF PRÄMASSING.